United States Patent [19]
LaPointe

[11] 3,741,125
[45] June 26, 1973

[54] STABILIZED ROCKET HEAD

[75] Inventor: Andre' E. La Pointe, Rockville, Md.

[73] Assignee: The United States of America as represented by the Secretary of the Navy, Washington, D.C.

[22] Filed: Nov. 22, 1960

[21] Appl. No.: 71,107

[52] U.S. Cl................. 102/49.4, 102/34.4, 102/89, 343/18 E
[51] Int. Cl. ...................... F42b 13/28, F42b 13/42
[58] Field of Search................. 102/7.2, 34.4, 35.6, 102/37.6, 63, 89, 2, 49.4; 221/271; 343/18 B, 18.2, 18

[56] References Cited
UNITED STATES PATENTS

| 2,014,393 | 9/1935 | Mathsen | 102/79 |
| 2,398,740 | 4/1946 | Halvey | 102/63 |
| 2,476,302 | 7/1949 | Jeppson | 102/34.4 |
| 2,973,712 | 3/1961 | Sekella et al. | 102/89 |
| 3,023,703 | 3/1962 | Beatly | 102/89 |

Primary Examiner—Verlin R. Pendegrass
Attorney—Louis A. Miller, B. L. Zangwill and B. H. Bochenek

EXEMPLARY CLAIM

1. A rocket head for attachment to a spin stabilized rocket motor, said rocket head comprising, a body tube, means at the rearward end of said tube for closing said body tube and adapted for attachment to a rocket motor, a removable tube closure assembly attached to the forward end of said body tube means actuated by rotation of the rocket head for releasing said removable tube closure, a plurality of packages of loosely packed radar reflective material removably contained within said body tube; and ejection means within the tube body for ejecting said packages one at a time with a time delay therebetween upon removal from said body tube of said removable tube closure assembly from the forward end of the body tube.

15 Claims, 4 Drawing Figures

INVENTOR
ANDRE E. LaPOINTE

INVENTOR
ANDRE E. LaPOINTE

ATTORNEYS

INVENTOR
ANDRE E. LaPOINTE

ATTORNEYS

STABILIZED ROCKET HEAD

The invention described herein may be manufactured and used by or for the Government of the United States of America for governmental purposes without the payment of any royalties thereon or therefor.

This invention relates to a spin stabilized rocket head adapted to contain and disperse quantities of radar reflective material after launching and while in flight, and more particularly to means for automatically open the rocket head so as to release said reflective material.

The instant invention applies to the field of radar countermeasures, and more specifically to the airborne distribution of radar reflective material. The radar reflective material, when distributed in the air slightly above the ground, provides a false radar image and thereby serves to screen ground activities and/or have the net effect upon a radar scope, of indicating an enlarged land area. In the past, radar countermeasures have consisted largely of attaching radar reflective material to airborne ballons and the like, and allowing said balloons to drift with the ambient wind currents. The balloon supported radar reflective material has not proven satisfactory because it presents considerable difficulty as to control and uniform distribution of the radar reflective material. Furthermore it has been found that such a system does not produce a radar-scope image which will adequately screen activities, materials, or land areas of any significant size.

The instant invention has been developed to overcome the aforementioned disadvantages of the prior art radar countermeasures. The instant structure includes a tubular rocket head adapted to be attached to a spin-stabilized rocket motor for spinning motion therewith about a longitudinal axis. The head contains a plurality of packages of radar reflective dipoles and a compressed spring tending to eject said dipoles from the head. An open end of the head has a removable cover plate is held in position by a latch means that is adapted to be disengaged from the cover retaining position by the spinning motion of the head, so that the aforementioned spring may eject the cover plate and dipoles from the head.

It is accordingly an object of this invention to provide a means for the uniform airborne distribution of radar reflective material.

It is another object of this invention to provide a rocket launched device adapted to uniformly distribute radar reflective material once it is airborne.

It is still another object of this invention to provide a rocket head containing a quantity of radar reflective material, which rocket head is stabilized in flight by rotation thereof by the rocket.

A further object of this invention is to provide a rotary rocket head containing a quantity of radar reflective material and adapted to release said material at predetermined intervals of time during its flight.

An added object of this invention is to provide a rotary rocket head containing a quantity of radar reflective material and including means actuated by said rotary motion for releasing the radar reflective material from the rocket head.

Other objects and many of the attendant advantages of this invention will be readily appreciated as the same becomes better understood by reference to the following detailed description when considered in connection with the accompanying drawings wherein.

Figure 1:
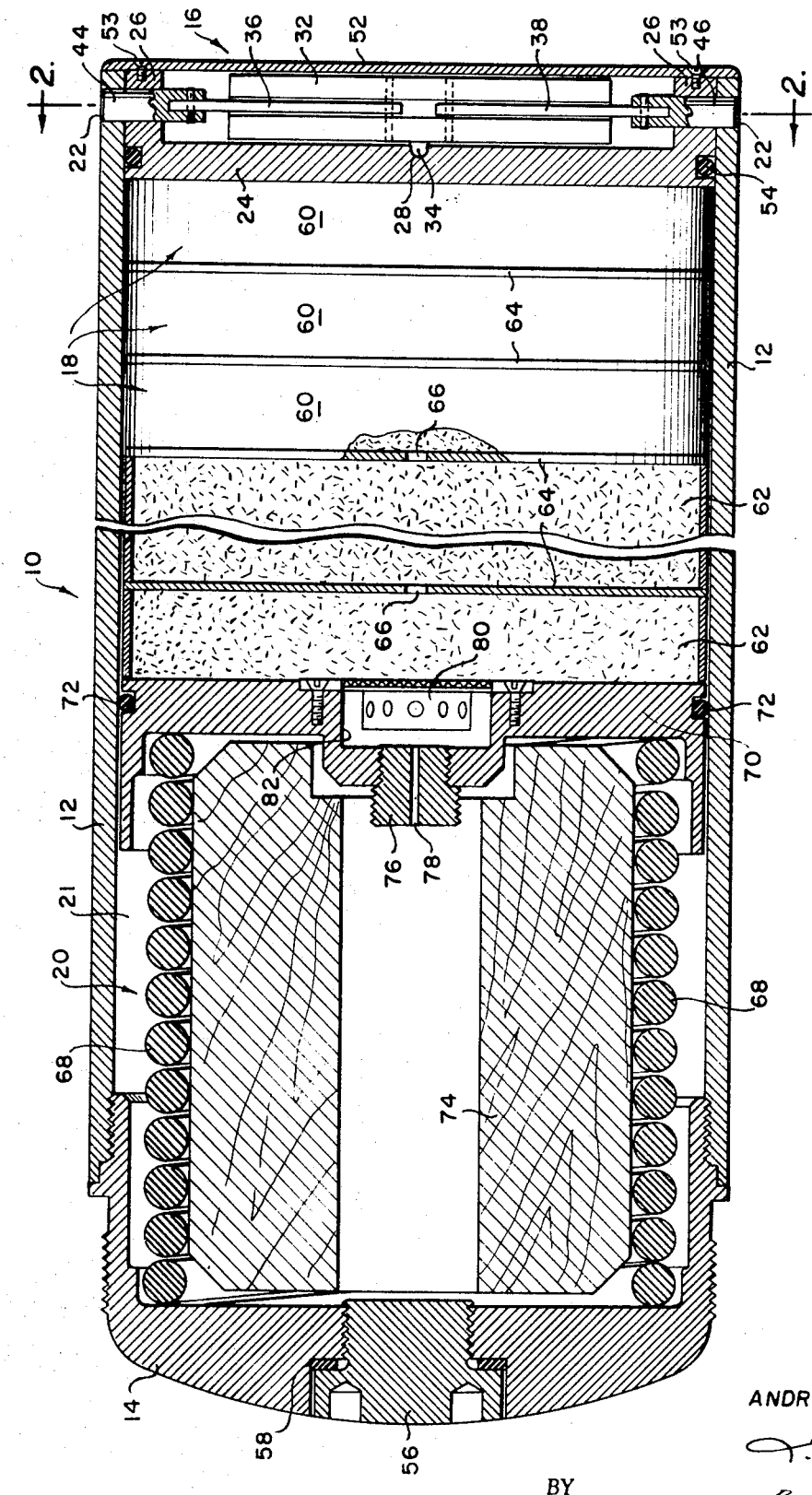
FIG. 1 is a longitudinal sectional view of an embodiment of the instant rocket head.

Referring now to the drawings wherein like reference numerals designate like or corresponding parts throughout the several views, there is shown in FIG. 1 a rocket head 10 constructed in accordance with the instant invention.

The rocket head 10 comprises a tubular body portion 12, hereinafter referred to as a body tube. The body tube 12 has a screw-in rocket motor adapter 14 removably mounted at its rearmost end, and a front closure plate assembly 16 removably mounted at its forward end. The rocket 10 has a plurality of packages 18 of radar reflective material removably contained therein adjacent its forward end, and a package ejector assembly 20 mounted adjacent its rearward end.

The body tube 12 has a pair of diametrically spaced holes 22 extending therethrough adjacent its forward end, by cooperation with which the front closure assembly 16 is held connected to the body tube 12.

The front closure assembly 16 includes a cup shaped receptacle 24 having a bottom portion and an annular side wall 26. The bottom portion of the cup shaped member 24 has a diametrically extending groove 28 formed therein and extending through the center thereof. The side wall 26 has a pair of diametrically opposed holes 30 formed therein and extending therethrough, said holes 30 being alignable with the holes 22 in the body tube 12, in the manner shown in FIGS. 1 through 3.

The front closure assembly 16 further includes a pair of movable, inertial masses 32 slidably mounted within the assembly 16, each of said masses having a downwardly extending rib 34 (FIG. 1) slidably mounted within the slot 28 to provide a guidance means for said masses 32. Each of the masses 32 has a pair of levers 36 pivotally connected thereto at one side of the slot 28, and another pair of levers 38 pivotally connected thereto adjacent the opposite side of the slot 28. Each of the levers 36 has one end pivotally connected to an inertial mass 32 by a pin 40 while each of the levers 38 is connected to the inertial mass 32 by a pin 42.

Each of the pair of levers 36 extends substantially outwardly of the center of the rocket head toward the side thereof, and each of the levers 36 has its outermost end pivotally connected to a locking pin 44 by a pivot pin 46. In a like manner each of the levers 38 has its outermost end pivotally connected to a second locking pin 48 by a pivot pin 50. Thus, when the inertial masses move outwardly from the center of the rocket head, as for example from the position shown in FIG. 2 to that shown in FIG. 3, the respective locking pins 44 and 48 are drawn inwardly toward the center of the rocket head and are moved to the retracted position shown in FIG. 3.

The front closure assembly 16 further includes a cover plate 52 removably connected to the side wall 26 of the cup-shaped member 24 by removable screws 53 threaded into the annular side wall 26. An air tight seal is provided between the peripheral surface of the cup 24 and the inside wall of the body tube 12 by an O-ring 54 mounted within a suitably provided peripheral recess in the cup 24.

Figure 2:
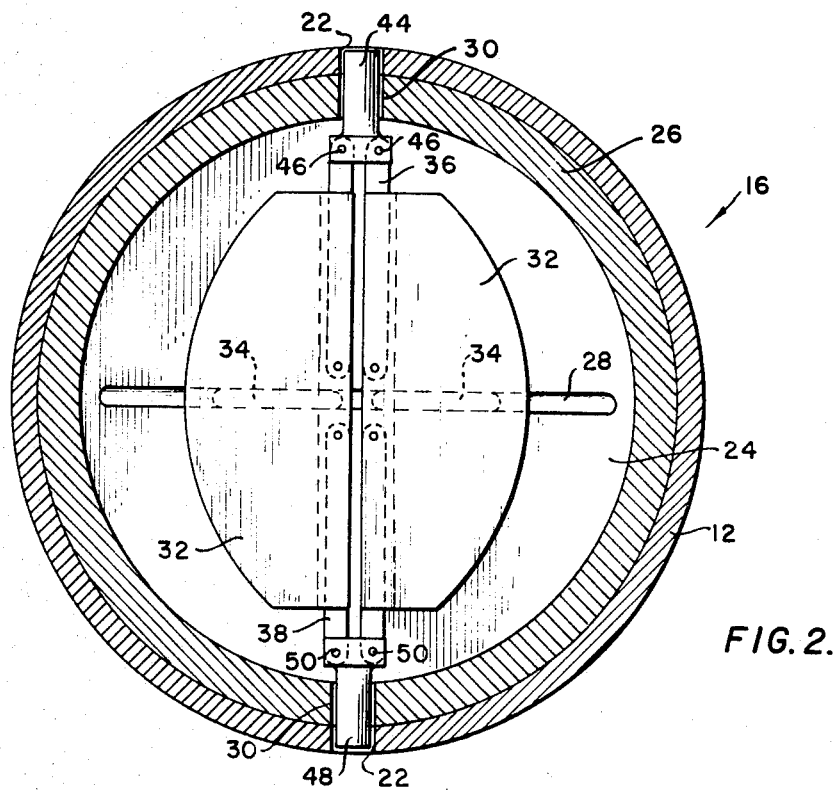
FIG. 2 is a transverse sectional view taken on line 2—2 of FIG. 1.
Figure 3:
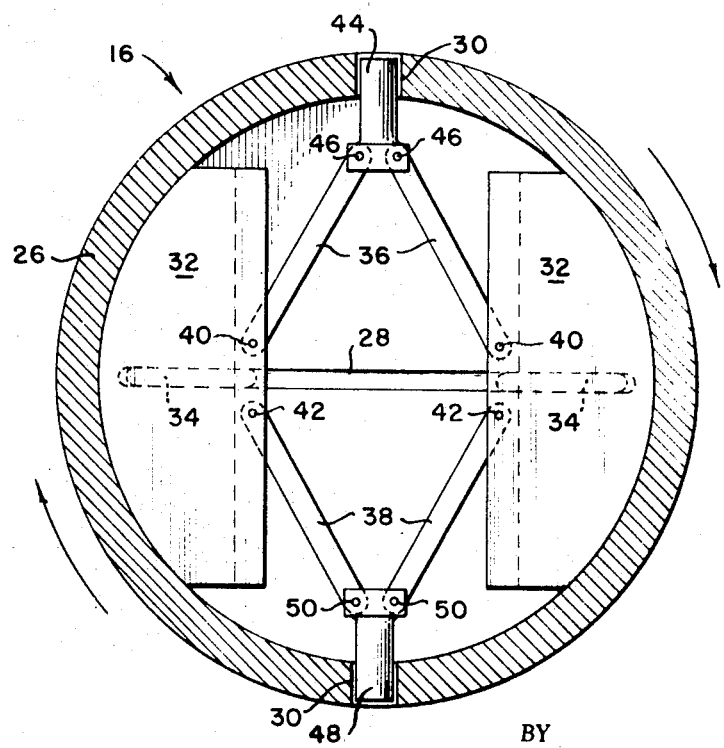
FIG. 3 is a transverse sectional view taken on the same line as FIG. 2, but showing the apparatus in another operative position.
Figure 4:
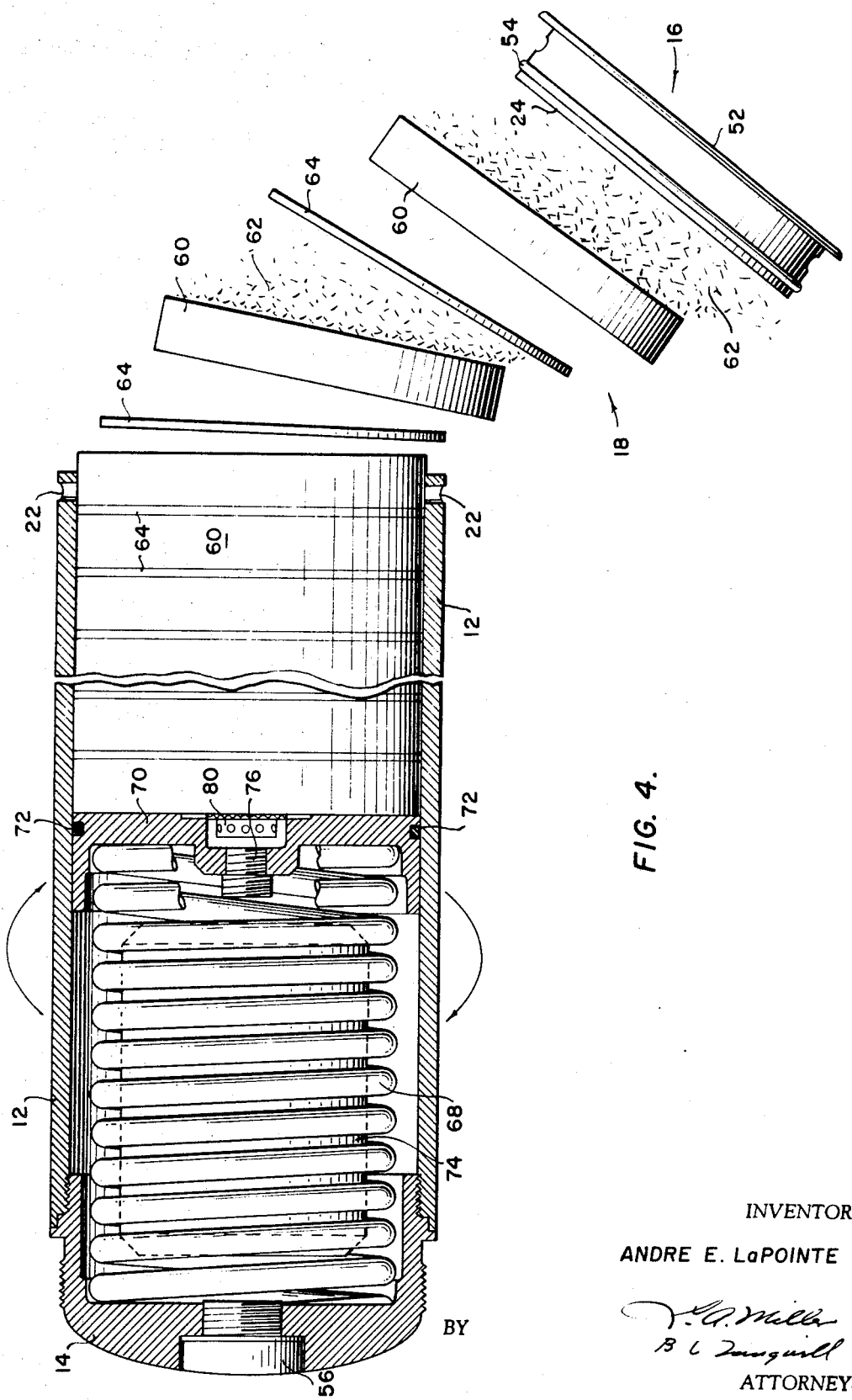
FIG. 4 is a longitudinal sectional view showing the instant rocket head during the process of dispersing the radar reflective material contained therein.

In the assembled condition of the rocket head, as shown in FIGS. 1 and 2, the inertial masses are located adjacent the center of the closure assembly 16, which serves to extend the respective locking pins 44 and 48 through the holes 30 and into the holes 22 in the body tube 12. The manner in which the pins 44 and 48 are retracted will be hereinafter described in greater detail.

The rocket is closed at its rearmost end by the rocket motor adapter 14, which is threadedly mounted within the body tube 12. The motor adapter 14 has a removable, threadedly mounted plug 56 in its rearmost portion; said plug 56 being used primarily for purposes of assemblying the rocket head. The plug 56 provides an airtight seal at the rear end of the rocket head by virtue of the use of a circular gasket 58 interposed between the head of the plug and the base of the hole within which a shoulder is located.

Each of the packages 18 of radar reflective material, hereinafter referred to as window packages, since they provide what is known in the art as a radar reflective window, comprises a ring 60 made of metal or the like and having an outer diameter substantially the same as the inside diameter of the body tube 12. A quantity of finely divided radar reflective material 62 is packaged within each of the rings 60 and is separated from each adjacent ring by a separator disc 64. Each disc 64 has a diameter the same as the outside diameter of the ring 60, and is provided with a hole 66 extending through the center thereof. A separator disc 64 covers each of the sides of each package 18 of radar reflective material, except for the respective end packages, the right hand one of which is covered by the inner surface of the cup-shaped element 24 while the left hand one is covered by a portion of the ejector mechanism 20, hereafter described in greater detail.

While various types of metallic radar reflective material 62 may be utilized in the instant invention, the most satisfactory results have been obtained with the use of aluminum coated plastic monofilament, and silvered nylon monofilament. In accordance with one embodiment of the invention, one type of aluminum coated monofilament has been used that is of such a size that there are 5,000,000 dipoles per package 18 about 4.4 inches inside diameter and 0.65 inches thick and the density thereof is 8.5 grams per cubic inch. When using a silvered nylon monofilament in the same size package there are 750,000 dipoles per package, having a density of 11 grams per cubic inch. As is well known in the art, the dipoles or radar reflective material 62 are essentially merely strands of plastic material or the like having a metallic coating on the outer surface thereof, and which by virtue of their pre-selected length have a radar reflective characteristic adapted to reflect radar signals of a certain frequency and wave length. Accordingly the length and density of the radar reflective material 62 is governed by the nature of the radar against which it is being used as a countermeasure, and can very readily be determined by one skilled in the art.

The ejector assembly 20, for ejecting the packages 18 from the rocket head includes a compressed, coil spring 68 mounted within the rear portion of the body tube 12. The spring 68 is in abutment, at its rearmost end, with the inside of the rocket adapter 14, and at its other end against one surface of a cup-shaped ejector piston assembly 70. The piston assembly 70 is circular in cross section and, acting together with an O-ring 72 located in a peripheral groove in the block 70, provides an air tight seal for the compartment in which the spring 68 is mounted. Also included in the ejector assembly 20 for purposes hereinafter described, is a cylindrical wooden block 74 removably mounted within the coil spring 68 so as to provide a limited volume of air within the compartment in which the spring 68 is located.

In order to provide for the inlet of air into the compartment within which the spring 68 is mounted, so as to allow forward movement of the ejector piston 70, said piston is provided at the center thereof with an orifice plug 76. The plug 76 has a hole 78 extending axially therethrough and in communication with the forward chamber of the rocket head 10. The plug 70 also includes an air filter 80 removably mounted within a recess 82 formed in the ejector piston. It is emphasized that the size of the hole 78 is determined by the rate of speed at which it is desired that the ejector piston 70 move forwardly towards the forward end of the rocket head, and accordingly the rate at which the radar reflective window packages 18 be ejected from the rocket head.

OPERATION

Prior to launching of the instant rocket head 10, said rocket head is attached by the adapter 14 to the forward end of a rocket motor, which in accordance with the instant invention, rotates about its longitudinal axis, and which therefore rotates the instant rocket head 10 for purposes of lending stability thereto.

When the rocket and rocket head are initially launched, both are subjected to rotation about their longitudinal axis. The resultant centrifugal force causes the locking pins 44 and 48 to be retracted due to the outward movement of the inertial masses 32, from the position shown in FIG. 2 to that shown in FIG. 3, thereby removing the locking pins 44 and 48 from the holes 22 in the body tube 12. However the front closure assembly 16 is not immediately ejected from the body tube 12 due to the forward acceleration of the rocket which continues to hold the closure assembly 16 in place until the end of the burning of the rocket. At the end of burning, the front closure 16 is pushed clear of the body tube 12 by the action ejection spring 68. The removal of the closure 16 is followed by the ejection of the window packages 18, one at a time.

As the rocket head 10 rotates about its longitudinal axis, the radar reflective dipoles 62 are, by the action of centrifugal force, forced against the outer periphery of the rocket head, thereby leaving a hole in the center of each pacakge 18. Thus by virtue of the presence of the holes 66 in the center of each of the separator disks 64, air passes from the forward end of the open rocket head, through the packages 18, the air filter 80 and the hole 78 into the chamber in which the spring 68 is mounted.

The rate at which air enters the chamber in which the spring 68 is located determines the rate at which the spring expands and forces the ejector piston 70 forwardly thereby determining the rate at which the packages 18 are ejected from the rocket head. In accordance with one embodiment of the instant invention, the rate of air passage into the chamber 21 is such that for a rocket head trajectory of 2,600 yds., a window package 18 is ejected approximately every 470 feet, thereby providing a uniform distribution of radar reflective dipoles along the line of flight of the rocket head.

It is emphasized that the instant invention can be produced in various sizes. By way of example, one embodiment of the instant invention has a body tube 12 having an inside diameter of 4.5 inches, with the rocket head, having an overall length of approximately 18.75 inches. The rearmost ejector assembly 20 occupies an internal length, including the thickness of the injector piston 70 of 6.2 inches. With the aforementioned dimensions the rocket head holds approximately 15 window packages 18, each of which has a thickness, including the thickness of the separator disks 64, of approximately 0.7 inches. Each of the window packages 18 has an inside diameter of approximately 4.4 inches.

As indicated above, when the instant rocket head 10 is attached to a conventional, spin stabilized 5 inch rocket and fired from the ground at an angle of about 30°, it has a trajectory of approximately 2,600 yards; and when containing 16 to 17 window packages it discharges one package at approximately every 470 feet. Such a rate of discharge provides a radar reflective window of substantially uniform density which results in a radar-scope image that has the net effect of either shielding elements found on the ground or water, or acts as an extension of said ground or water.

The rocket motor utilized in conjunction with the instant invention has not been illustrated since it, in itself, is not novel. It is emphasized that any suitably sized, spin-stablized rocket, that is, a rocket so constructed as to rotate about its longitudinal axis, can be used in conjunction with the instant rocket head 10.

Obviously many modifications and variations of the present invention are possible in the light of the above teachings. It is therefore to be understood that within the scope of the appended claims the invention may be practiced otherwise than as specifically described.

What is claimed is:

1. A rocket head for attachment to a spin stabilized rocket motor, said rocket head comprising, a body tube, means at the rearward end of said tube for closing said body tube and adapted for attachment to a rocket motor, a removable tube closure assembly attached to the forward end of said body tube, means actuated by rotation of the rocket head for releasing said removable tube closure, a plurality of packages of loosely packed radar reflective material removably contained within said body tube; and ejection means within the tube body for ejecting said packages one at a time with a time delay therebetween upon removal from said body tube of said removable tube closure assembly from the forward end of the body tube.

2. A rocket head adapted for attachment to a spin stabilized rocket motor wherein the rocket head is caused to rotate about its longitudinal axis upon launching of the rocket motor, said rocket head comprising a body tube, a rocket motor adapter fixedly connected to one end of said body tube and forming an airtight connection with said body tube whereby the rocket head is adapted for attachment to a rocket, a body tube closure assembly removably connected to the opposite end of said body tube in airtight relation therewith, means actuated by the rotation of said rocket head included in said body tube closure assembly for automatically disconnecting the assembly from the body tube after launching of the rocket head, a plurality of packages of radar reflective material within the body tube in abutment with the inner side of said body tube closure assembly, an ejector piston bearing against said plurality of packages of radar reflective material, a resilient means pressing said ejector piston against said packages thereby tending to eject them from the body tube upon the removal of said body tube closure assembly and means governing, the rate of movement of said ejector piston upon removal of said body tube closure assembly, said means being so adjusted that said packages are ejected from said body tube at predetermined intervals of time after removal of said body tube closure assembly.

3. A rocket head assembly as defined in claim 2, wherein said ejector piston has the peripheral portion thereof mounted in substantially air tight relation with the inner wall of said body tube, and the ejector piston has an orifice extending therethrough whereby air is allowed to flow into the area behind the piston thereby gradually breaking the vacuum created therein due to the relative movement of the piston relative to the body tube under the action of said resilient means.

4. A rocket head as set forth in claim 2, wherein said body tube closure assembly comprises, a cup shaped member in air tight contact with the inner wall of said body tube and having mounted thereon at least one retractable locking member in removable engagement with said body tube thereby retaining said body tube closure assembly connected to the body tube, and means actuated by the rotation of the rocket head by a rocket motor adapted to remove said locking member from connection with said body tube, whereby said body tube closure assembly is adapted to be ejected from the end of said body tube thereby allowing ejection of the packages of said radar reflective material from the body tube.

5. A rocket head assembly adapted for attachment to a spin stabilized rocket motor whereby said rocket head assembly is caused to rotate about its longitudinal axis during flight, said rocket head assembly comprising a body tube, a rocket motor attaching adapter connected to one end of said body tube in air tight relation therewith, a removable and ejectable cover plate assembly attached to the other end of said body tube in air tight relation therewith, a plurality of sequentially arranged packages of radar reflective material within said body tube, a package ejector piston slidably mounted within said body tube and having a portion thereof in contact with at least one of said packages, resilient means tending to bias said ejector piston toward said packages to force the same against the inner side of the cover plate assembly, and means included in said cover plate assembly actuated upon rotation of the rocket head to disconnect the cover plate assembly from the body tube whereby said resilient means sequentially ejects said packages of radar reflective material with a time interval therebetween from the body tube upon removal therefrom of said cover plate assembly.

6. A rocket head assembly as set forth in claim 5 wherein, said cover plate assembly includes, a plurality of locking pins movably connected thereto and removably connected to said body tube, and means actuated by the spinning of said rocket head for removing the locking pins from engagement with said body tube, whereby said cover plate assembly is adapted to be ejected from the body tube by the action of said resilient means on said ejector piston and said packages.

7. A rocket head assembly as set forth in claim 5 wherein each of said packages of radar reflective material comprises, a circular band having an outer surface thereof substantially in contact with the inner wall of said body tube and has contained within its periphery said radar reflective material, said circular bands being separated from one another by a removable circular plate, and each of said circular plates having a hole formed substantially in the center thereof and extending therethrough.

8. A rocket head assembly as set forth in claim 7 wherein said ejector piston is substantially circular in form and wherein the peripheral surface thereof makes substantially air tight contact with the inner wall of the body tube and has the transverse surface thereof in contact with one of said packages of radar reflective material, said ejector piston further including an air passage formed therein and extending therethrough whereby after removal of said cover plate assembly air is adapted to pass through said body tube through the holes in said circular plates and the ejector piston to the compartment between said piston and said rocket connection adapter, thereby breaking any vacuum created in said compartment by the forward movement of said ejector piston under the influence of said resilient means.

9. A rocket head assembly as set forth in claim 5, wherein said resilient means comprises a compressed coil spring having one end thereof in abutment with the inside of said rocket connection adapter and the other end thereof in abutment with one side of said ejector piston thereby tending to bias said ejector piston and the packages of radar reflective material out of said rocket head upon removal therefrom of said coverplate assembly.

10. A rocket head assembly having one end adapted for attachment to a rocket motor, comprising, a body tube, a removable cover plate assembly connected to one end of said body tube, a plurality of superposed, sequentially arranged packages of radar reflective material within said body tube in removable relation with the interior of said body tube, one of said packages being in abutment with the inner side of said cover plate assembly, said cover plate assembly including means actuated by rotation of the rocket head by a rocket motor to release said cover plate assembly from the body tube; and ejector means acting upon said packages adapted to sequentially eject said packages with a time interval therebetween from said body tube upon removal therefrom of the cover plate assembly.

11. A rocket head assembly as set forth in claim 10, wherein said packages are interposed between the innerside of said cover plate assembly and an ejector piston slidably mounted within the body tube and spaced from said cover plate assembly, said ejector means including a compressed spring tending to bias said ejector piston and therefore said packages outwardly of the body tube upon removal from said body tube of said cover plate assembly.

12. A rocket head assembly as set forth in claim 11 wherein said packages are defined by a plurality of sequentially arranged annular members, a circular plate interposed between adjacent annular members, each of said circular plates having a hole formed therein and extending therethrough, and said ejector piston having its peripheral surface in substantially airtight contact with the inner wall of said body tube, said piston having an orifice formed therein and extending therethrough, whereby air may pass through said packages and through said ejector piston upon removal from the rocket head of said cover plate assembly, thereby breaking any vacuum created behind said ejector piston as it is biased toward the open end of said rocket head by said spring.

13. A rocket head assembly as set forth in claim 12 wherein the hole in said ejector piston is of such a size as to cause the movement of said ejector piston relative to the body tube to be of such a speed as to eject said packages one at a time from the body tube at predetermined intervals of time.

14. A rocket head for attachment to a spin stabilized rocket motor for rotation with said motor, said rocket head comprising a body tube, a rocket attachment adapter plug attached to one end of said body tube, a cover plate assembly removably attached to the other end of said body tube, a plurality of sequentially arranged, removable packages of radar reflective material within said body tube, an ejector means between said adapter and said packages tending to eject said packages from the body tube, latch means in said cover plate assembly removably engaged with said body tube, and means in said cover plate assembly actuated upon rotation of the rocket head by a motor, to disengage said latch means from the body tube, so that said cover plate assembly and said packages are adapted to be ejected with a time interval therebetween from the tubes by said ejector means.

15. A rocket head assembly as defined in claim 1, wherein said removable tube closure assembly comprises, a cup shaped member having at least one retractable locking member mounted thereon and in removable engagement with said body tube, thereby retaining said removable tube closure assembly connected to the body tube, and said means actuated by the rotation of the rocket head by a rocket motor adapted to retract said locking member from connection with said body tube so that said removable tube closure assembly may be removed from the end of said body tube thereby allowing ejection of said packages of said radar reflective material from the body tube.

* * * * *